United States Patent [19]
Gregory

[11] 3,788,614
[45] Jan. 29, 1974

[54] MIXING SECTION FOR EXTRUDER FEED SCREW

[75] Inventor: Robert B. Gregory, Flemington, N.J.

[73] Assignee: GK Systems, Inc., Flemington, N.J.

[22] Filed: Dec. 6, 1972

[21] Appl. No.: 312,773

[52] U.S. Cl................................. 259/191, 425/209
[51] Int. Cl............................................... B01f 7/02
[58] Field of Search... 259/191, 192, 193, 9, 10, 25, 259/26, 45, 46, 97; 425/209

[56] References Cited
UNITED STATES PATENTS

| | | | |
|---|---|---|---|
| 2,453,088 | 11/1948 | Dulmage | 259/193 |
| 3,006,029 | 10/1961 | Saxton | 259/191 |
| 3,300,810 | 1/1967 | Gregory | 259/191 |
| 3,411,179 | 11/1968 | Gregory | 425/209 |

*Primary Examiner*—Robert W. Jenkins
*Attorney, Agent, or Firm*—Thomas E. Tate

[57] ABSTRACT

This invention is directed to an extruder feed screw having an intermediate cylindrical mixing section provided on its outer surface with a plurality of concave channels of uniform depth and disposed as a plurality of interlocked helices of the same hand. In each adjacent pair of channels, the input end of one is open and its discharge end is closed, while in the other channel its imput end is closed and its discharge end is open. By this construction, dispersive and distributive mixing of the throughput are achieved more rapidly and production rates are markedly increased without degradation of the product.

9 Claims, 4 Drawing Figures

PATENTED JAN 29 1974 3,788,614

MIXING SECTION FOR EXTRUDER FEED SCREW

THE INVENTION

This invention generally relates to new and useful improvements in feed screws used for the hot melt extrusions of thermoplastic materials and particularly seeks to provide a novel feed screw in which the mixing section thereof is so designed and constructed as to enable a marked production increase to be effected, virtually regardless of the specific types or blends of thermoplastic materials involved, while still effecting the desired dispersive mixing and a near isothermal condition of the extrudate.

More specifically, the feed screw mixing section of this invention is an improvement over that disclosed in the Gregory, et al. U.S. Pat. No. 3,411,179 of Nov. 19, 1968, in that it is better capable of effecting the dispersive mixing and temperature uniformity of readily degradable polymers, or mixtures containing such, at a sufficiently increased production rate on the order of at least 40 percent, whereby to decrease throughput time enough to prevent degradation of the polymer. Obviously, this increase in production rate is also of advantage in the mixing and extrusion of polymers that are not so readily degradable, since the over all operating efficiency of the extruder is substantially improved.

As stated in the above-mentioned Gregory, et al. patent and repeated here, one of the heretofore unsolved problems in extruding thermoplastics by screw extruders, which are required to operate at high production rates, is the loss of temperature uniformity of the extrudates. Due to the typical inverse relationship of viscosity and temperature, a wide range of temperatures results in an uneven or irregular output flow through the extrusion die, since the flow rate through the die is proportional to the extrudate viscosity. Therefore, it is important to obtain, or at least closely approximate, an isothermal melt temperature in order to achieve a substantially constant and uniform flow rate through the die under any given set of permissible operating conditions.

It is also known that temperature uniformity is a function of the mixing involved in screw extrusion processes. One phase of such mixing may be described as the simultaneous application of high shear stress to the higher viscosity components of the extrudate and a lower shear stress to the lower viscosity components, thereby supplying more energy to the higher viscosity components than to the lower. This phase of mixing is generally referred to as "dispersive mixing."

It is also known that temperature uniformity is a function of the distributive mixing ability of the screw, by which polymer particles that are adjacent at the input end become progressively separated as the melt advances toward the discharge end. It has been established that the more widely separated the particles become as the result of this mixing, the more uniform the extrudate temperature becomes.

In addition to the attainment of uniform temperature and viscosity, proper mixing also is of importance where pigments or other additives are to be uniformly distributed through the extrudate or blends of different polymers are to be extruded.

These operating goals are met and surpassed through the use of an extruder feed screw having an improved mixing section constructed in accordance with this invention since the desired dispersive and distributive mixing can be achieved with less retention time than heretofore possible, thus obtaining a marked increase in throughput rate and enabling the use of polymers that otherwise would become degraded as the result of the longer retention times heretofore used.

Therefore, an object of this invention is to provide an extruder feed screw having a mixing section capable of effecting proper dispersive and distributive mixing of an extrudate at a throughput rate markedly greater than has heretofore been possible.

Another object of this invention is to provide an extruder feed screw mixing section of the character stated that enables the use of those types of polymers that heretofore would have become degraded as the result of passage along prior known types of extruder feed screws and the mixing sections thereof.

Another object of this invention is to provide an extruder feed screw of the character stated in which the mixing section thereof is a cylinder of uniform diameter provided on its outer surface with a plurality of concave channels of uniform depth and disposed as a plurality of interlocked helices of the same hand with alternate channels being open at their input ends and closed at their discharge ends while the remaining alternate channels are closed at their input ends and open at their discharge ends.

Another object of this invention is to provide an extruder feed screw of the character stated in which the helix angle in a development of the cylindrical mixing section is on the order of 30°.

A further object of this invention is to provide an extruder feed screw of the character stated that is simple in design, rugged in construction and economical to manufacture.

With these and other objects, the nature of which will become apparent, the invention will be more fully understood by reference to the drawings, the accompanying detailed description and the appended claims.

Figure 1:
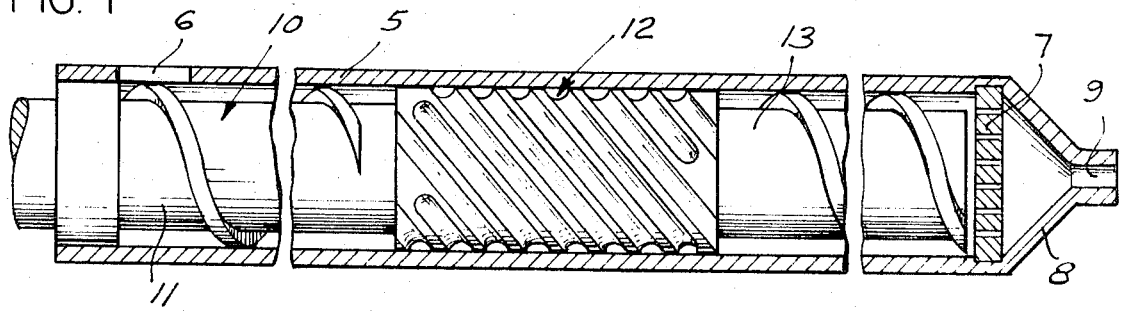
FIG. 1 is a partly broken longitudinal section of an extruder barrel having an extruder feed screw provided with a mixing section constructed in accordance with this invention.
Figure 2:
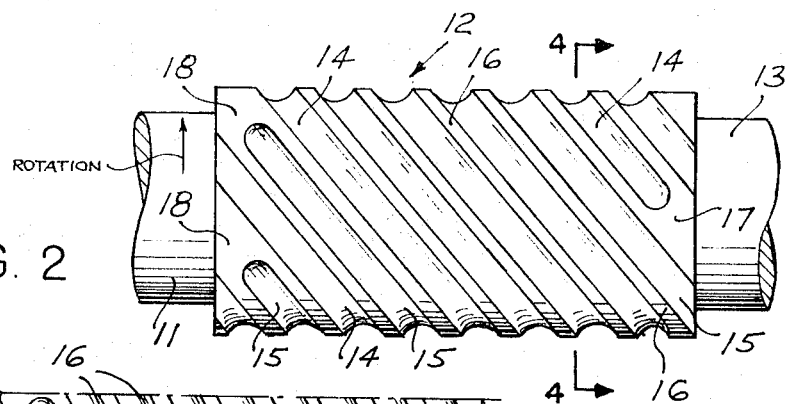
FIG. 2 is an enlarged side elevation of the mixing section.

Referring to the drawings in detail the invention, as illustrated, is embodied in an extruder for hot melt plastics and includes a cylindrical barrel 5 provided at its input end with an inlet 6 for admission of plastic material to be extruded and at its discharge end a strainer plate 7 and a discharge head 8 having an extrusion orifice 9.

An extruder feed screw generally indicated at 10 is rotatably carried within the barrel 5 and includes a metering section 11 adjacent the input end, an intermediate mixing section generally indicated 12, to which this invention specifically relates, and a feed section 13 adjacent the discharge end.

The mixing section 12 comprises a cylinder of uniform outside diameter and, in the illustrated embodiment, preferably has a length to diameter ratio of 2:1.

The outer surface of the cylinder is machined to define a plurality of concave cross sectioned interlocked helical grooves 14 and 15 separated by intervening lands or flights 16. This type of surface grooving may be considered somewhat analagous to the double threads frequently used to secure the bezel of a ship's clock to its case. In the present instance the grooves 14 alternate with the grooves 15, the input end of each groove 14 is open while its opposite end is closed at 17, and the input end of each groove 15 is closed as at 18 while its opposite end is open.

Figure 3:
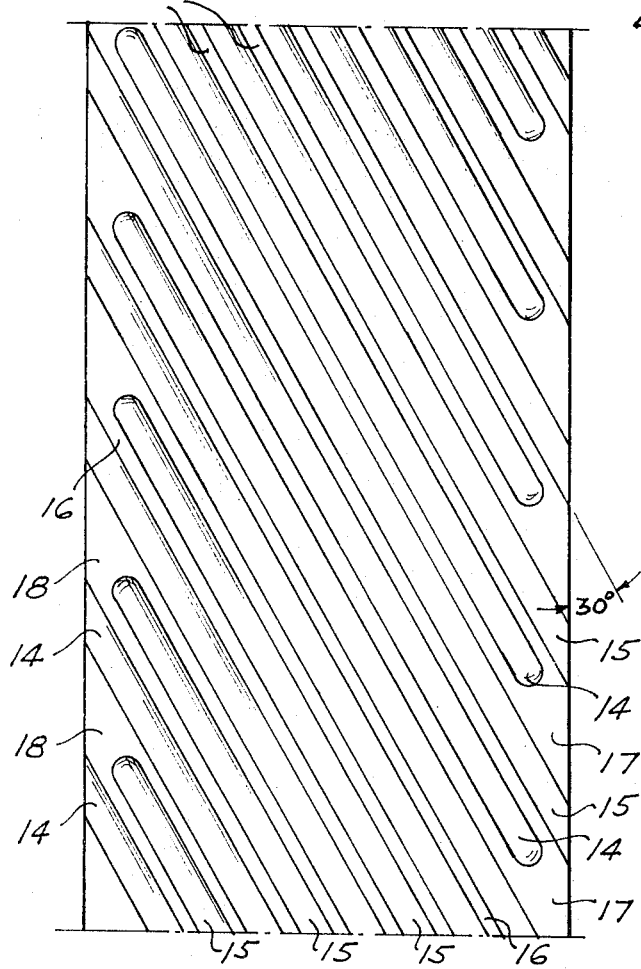
FIG. 3 is a development on the mixing section.
Figure 4:
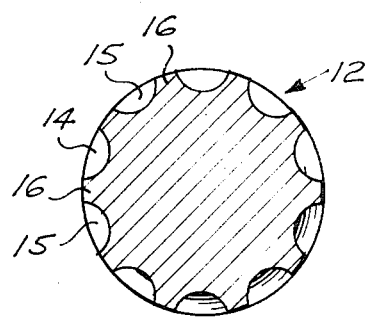
FIG. 4 is a transverse vertical section taken along line 4—4 of FIG. 2

The helix angle of the grooves and lands preferably is on the order of 30° as indicated on the development of FIG. 3 and the grooves 14 and 15 are of the same cross-section and of uniform depths throughout their lengths, except of course at the respective closed ends. The outside diameter of at least the mixing section 12 of the feed screw 10 is sufficiently less than the inside diameter of the barrel 5 as to provide a clearance of about 0.001 inch to 0.005 inch therebetween.

Typically, in a mixing section 12 having a length of 9 inches, an outside diameter of 4.5 inches, and a helix angle of 30°, the grooves 14 and 15 may be arcuately cross-sectioned with a width of say 0.50 inch and depth of say 0.40 inch and the intervening lands or flights 16 may be of say a width of 0.1875 inch.

Although in the above described embodiment of the invention the length to diameter ratio of the mixing section 12 has been stated to be 2:1, it will be understood that this may be varied in accordance with requirements imposed by different operating conditions or by differences in the types of plastics being extruded, and may be as short as 1:1 or as long as 6:1. Similarly, while the helix angle preferably is on the order of 30° as previously described, it may be as small as about 22½° or as large as about 45°, depending on the speed of rotation of the feed screw and other factors that determine the retention time necessary to achieve the desired dispersive and distributive mixing of the plastic throughput at a maximum production rate.

It is of course to be understood that variations in arrangements and proportions of parts may be made within the scope of the appended claims.

I claim:

1. A feed screw for rotatable installation in the barrel of a machine for extruding hot melt plastics and including a metering section along its input end, an intermediate mixing section and a feeding section along its discharge end; said mixing section being in the form of a cylinder whose axis is the same as that of said feed screw and having a diameter such as to fit within said barrel with a predetermined radial clearance with respect thereto, the outer surface portions of said cylinder being configured along its full length to define a plurality of spaced concave channels of uniform depth and disposed as a plurality of interlocked helices of the same hand, the material of said cylinder between said spaced channels defining complementary helical flights, each of said channels having an input end and a discharge end.

2. The feed screw of claim 1 in which in each successive pair of said channels one of said channels is open at its input end and closed at its discharge end while the other thereof is closed at its input end and open at its discharge end.

3. The feed screw of claim 2 wherein the width of said channels is at least twice that of said helical flights.

4. The feed screw of claim 3 wherein the depth of each said channel is at least 80 percent of its width.

5. The feed screw of claim 4 wherein each said channel is arcuately cross-sectioned.

6. The feed screw of claim 2 in which the length to diamter ratio of the cylinder defining said mixing section is from about 1:1 to about 6:1.

7. The feed screw of claim 6 in which said length to diameter ratio is on the order of 2:1.

8. The feed screw of claim 2 in which the helix angle of said channels and flights, as measured on a development thereof, is on the order of 22½° to 45°.

9. The feed screw of claim 8 in which the helix angle of said channels and flights is on the order of 30°.

* * * * *